Nov. 11, 1958

M. G. PRADES 2,859,533

COMBINED LEVEL AND INCLINOMETER

Filed June 7, 1957

INVENTOR.
MANUEL GIRONA PRADES,
BY
McMorrow, Berman + Davidson
ATTORNEYS.

Nov. 11, 1958  M. G. PRADES  2,859,533
COMBINED LEVEL AND INCLINOMETER
Filed June 7, 1957  2 Sheets-Sheet 2

INVENTOR.
MANUEL GIRONA PRADES,
BY
McMorrow, Berman + Davidson
ATTORNEYS.

United States Patent Office

2,859,533
Patented Nov. 11, 1958

2,859,533

COMBINED LEVEL AND INCLINOMETER

Manuel Girona Prades, Hamilton, Ontario, Canada

Application June 7, 1957, Serial No. 664,237

5 Claims. (Cl. 33—206)

This invention relates to a combination level and inclinometer, and more specifically, the present invention pertains to means for accurately determining the number of degrees an element departs from either a horizontal or vertical plane.

One of the primary objects of this invention is to provide a combined level and inclinometer of the type referred to above wherein friction between the movable elements thereof has been reduced to a minimum.

A further object of this invention is to provide a combined level and inclinometer which includes a float suspended in a liquid the float having graduated dials on three sides thereof and being positioned within a receptacle constructed of transparent material.

A still further object of this invention is to provide a combined level and inclinometer for determining accurately any degree of grade, level, or pitch which is necessary in constructional work.

This invention contemplates, as still another object thereof, the provision of a combination level and inclinometer of the type referred to above which is noncomplex in construction and assembly, inexpensive to manufacture, and durable in use.

Other and further objects and advantages of the instant invention will become more apparent from a consideration of the following specification when read in conjunction with the annexed drawings, in which.

Figure 1:
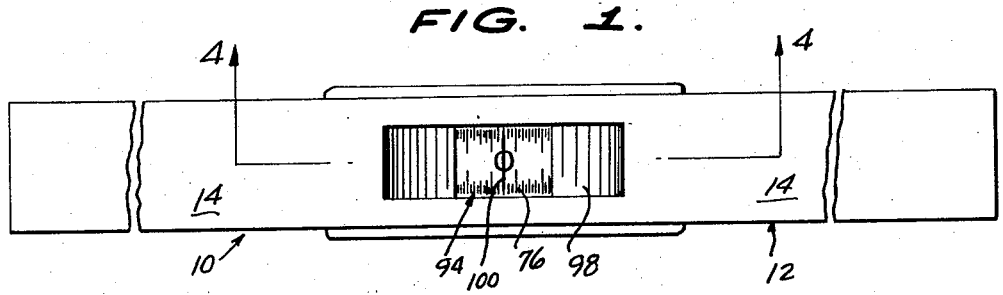
Figure 1 is a top plan view of a combined level and inclinometer constructed in accordance with the teachings of this invention.

Referring now more specifically to the drawings, reference numeral 10 designates, in general, a combined level and inclinometer constructed in accordance with this invention. The combined level and inclinometer 10 is seen to comprise an elongated I-shaped element 12 having oppositely disposed, laterally spaced and substantially parallel elongated flanges 14, 16, and a pair of longitudinally spaced oppositely disposed and substantially parallel end of flanges 18, 20, the flanges 14, 16 and 18, 20 being interconnected by elongated substantially rectangular webs 22, 24.

Figure 2:
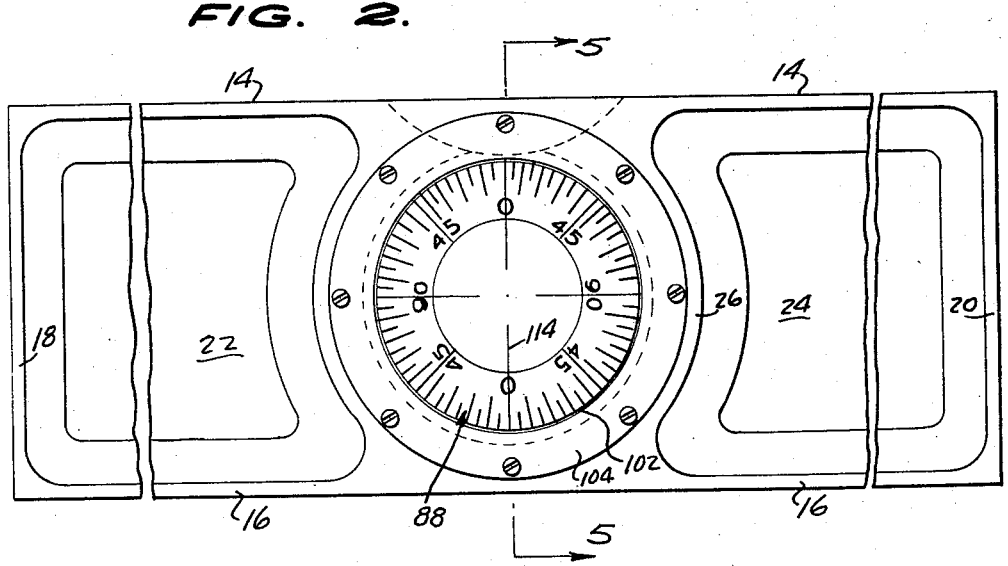
Figure 2 is a side elevational view of the combined level and inclinometer shown in Figure 1.
Figure 3:
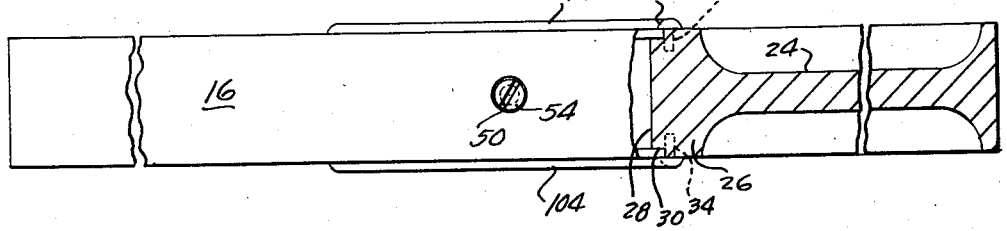
Figure 3 is a bottom plan view of the combined level and inclinometer, portions thereof being broken away to more clearly illustrate the component parts thereof.
Figure 4:
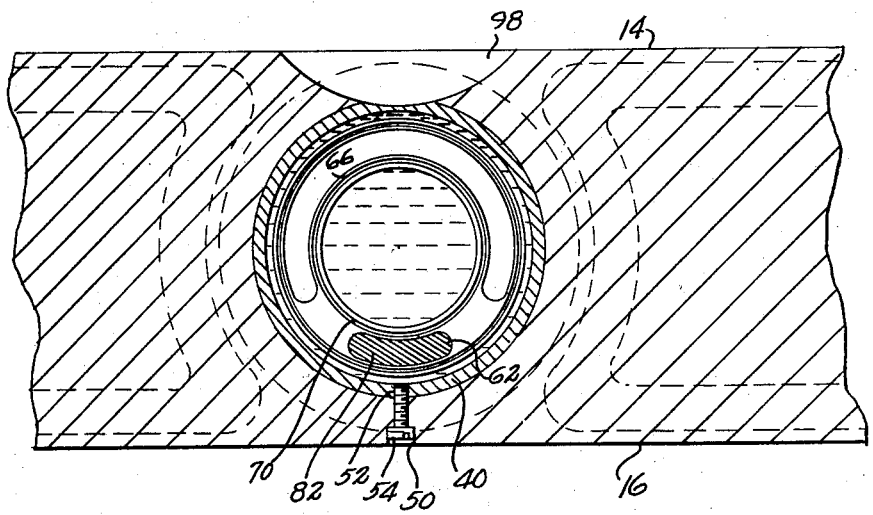
Figure 4 is an enlarged fragmentary detailed cross sectional view taken on the horizontal plane of line 4—4 of Figure 1, looking in the direction of the arrows.
Figure 5:
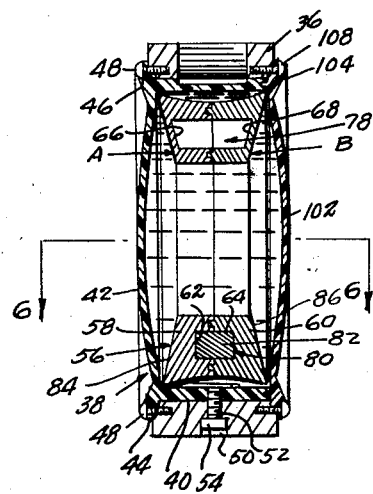
Figure 5 is a detailed cross sectional view taken on the vertical plane of line 5—5 of Figure 2, looking in the direction of the arrows.
Figure 6:
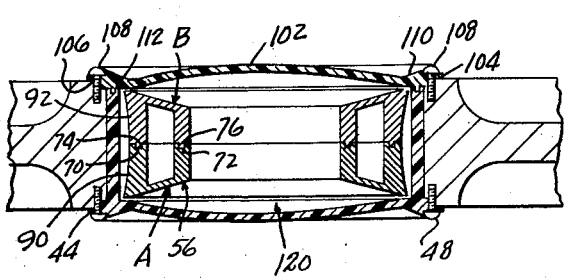
Figure 6 is a detailed cross sectional view taken on the horizontal plane of line 6—6 of Figure 5, looking in the direction of the arrows.

Reference numeral 26 designates an enlarged boss integrally connected with and extending between the elongated flanges 14, 16 intermediate their respective ends and is also integrally connected with the adjacent inner ends of the web 22, 24. The boss 26 is provided with a central bore 28 extending transversely therethrough. As is clearly seen in Figures 2 and 5, the opposite ends of the boss 26 are formed with a pair of oppositely disposed circumferential grooves 30, 32 adjacent the bore 28 and a plurality of radially spaced internally threaded screw receiving openings 34, 36 are disposed adjacent the grooves 30, and 32, respectively.

An elongated substantially hollow cylindrical casing 38 is provided and includes a substantially cylindrical side wall 40 having an outwardly bowed end wall 42 integrally formed with one end thereof. The end wall 42 has an integrally formed radial flange 44 which projects laterally and outwardly from the side wall 40. The flange 44 has a plurality of radially spaced bolt receiving openings 46 extending therethrough and spaced to match the spacing between the bolt receiving openings 34. For reasons to be made more clear below, the casing 38 is formed of a transparent plastic material.

The side wall 40 of the casing 38 is telescoped within the bore 28 with the flange 44 seating in the groove 30 and the openings 46 being aligned with the openings 34. Screws 48 extend through the openings 46 and are threaded into the openings 34 to rigidly connect the casing 38 to the boss 26.

To serve a function to be described, the flange 16 immediately below the bore 28 is provided with a countersunk passage 50 aligned with an internally threaded aperture 52 formed in the side wall 40. A screw 54 extends through the passage 50 and is threadedly received within the aperture 52.

A float formed of a plastic material is designated, in general, by reference numeral 56. The float 56 is a substantially hollow cylindrical element having opposed open ends and is split to form a pair of complementing substantially circular members A and B. Each of the members A and B includes a main body portion 58, 60, respectively, having oppositely disposed confronting arcuate recesses 62, 64 formed therein. The main body portions of each of the members A and B are also provided with elongated curvilinear recesses 66, 68 disposed in confronting relation. As is seen in the drawings, the member A is formed with a pair of concentrically spaced grooves 70, 72 which are adapted to receive a pair of concentrically spaced tongues 74, 76, respectively, which project laterally from the member B and are tightly pressed within the grooves 70, 72 to form a liquid tight seal between the members A and B. The elements A and B are assembled as described to form a hollow curvilinear chamber 78 and an arcuate chamber 80 the latter having an arcuately shaped weight 82 formed of non-magnetic material disposed therein. Each of the members A and B are provided with downward and inwardly inclined annular sides 84, 86 bearing indicia 88 thereon. The elements A and B have circumferential grooves 90, 92 formed therein which coact to form a dial face 94 having indicia 96 thereon. This dial face is viewed by the user through an arcuate recess 98 which extends through the flange 14 and the boss 26 to the outer side of the wall 40, the latter having a sight line 100 extending transversely thereacross.

An outwardly bowed circular end wall 102 formed of a transparent plastic material extends across the other end of the side wall 40 and is provided with a radial flange 104. The end wall 102 is seated in the groove 32 and the flange 104 is provided with the plurality of circumferentially spaced openings 106 which are aligned with the internally threaded openings 36 to receive screws 108 therein whereby the end wall 102 is rigidly secured to the boss 26.

To effect a liquid tight seal between the end wall 102 and the adjacent end of the side wall 40, the latter is provided with a circular groove 110 which receives therein a continuous circular tongue 112 which projects laterally from the end wall 102.

Both of the end walls 42 and 102 are provided with a plurality of sight lines 114 disposed substantially at right angles with respect to each other and traverse the indicia 88.

The cavity 120 defined by the side wall 40 and the end walls 42 and 102 is filled with a liquid having a predetermined specific gravity and viscosity. The liquid is introduced into the cavity 120 by passing the liquid through the countersunk opening 50 and the internally threaded aperture 52 after the screw 54 has been removed therefrom. After the cavity 120 has been filled, the screw 54 is replaced. The specific gravity of the liquid is chosen so that the float 56 remains constantly suspended therein, and the viscosity of the liquid is chosen in order to reduce to a minimum the friction between the relatively movable parts of the combined level and inclinometer.

In utilizing the above described level and inclinometer, the flange 16 may be placed upon any surface, the inclination of which is to be determined. Under these conditions, the angle of inclination can be read from either side of the device through the end walls 42, 102 and through the arcuate recess 98. Again, the inclination of any given surface may be determined by placing either of the flanges 18, 20 thereon and the angle of inclination read as described above.

Having described and illustrated one embodiment of this invention, it will be understood that the same is offered merely by way of example, and that this invention is to be limited only by the scope of the appended claims.

What is claimed is:

1. A combined level and inclinometer comprising an elongated I-shaped member having a pair of oppositely disposed longitudinally extending parallel flanges and a pair of oppositely disposed laterally extending end flanges, said end flanges, respectively, extending across adjacent pairs of ends of said longitudinally extending flanges at right angles thereto, a boss integrally connected with and extending between said longitudinally extending flanges intermediate the ends thereof, said boss having a centrally disposed opening extending transversely therethrough, an elongated substantially hollow cylindrical casing formed of a transparent material and including an elongated cylindrical wall having a pair of opposed closed ends, said wall being disposed within said opening, means fixedly securing said casing to said boss, each of said closed ends having at least one indicating line thereon, a float comprising a hollow cylindrical member having a pair of opposed open ends, said last named cylindrical member having an inwardly extendng annular side at each end thereof, each of said sides having indicia thereon, said float having weight means fixedly secured thereto, said float being disposed within said casing with said sides thereof being juxtaposed with respect to said closed ends of said casing, and a liquid disposed within and substantially filling said first hollow cylindrical member, said liquid having a preselected specific gravity so that said second cylindrical member is suspended therein free of frictional contact with said first hollow cylindrical member to permit relative rotation between said first and second cylindrical members.

2. A combined level and inclinometer as defined in claim 1 wherein one of said longitudinally extending flanges is provided with an arcuate recess which communicates at its inner end with said bore, said elongated cylindrical wall of said cylindrical casing having an indicating line extending transversely thereacross immediately adjacent the inner end of said recess, and said float having indicia disposed around the circumference thereof.

3. A combined level and inclinometer comprising an elongated I-shaped member having a pair of oppositely disposed longitudinally extending substantially parallel flanges and a pair of oppositely disposed laterally extending end flanges, said end flanges, respectively, extending across adjacent pairs of ends of said longitudinally extending flanges at right angles with respect thereto, a web extending between and interconnecting said longitudinal and laterally extending flanges, a boss integrally connected with and extending between said longitudinal extending flanges intermediate the ends thereof and integrally connected with adjacent ends of said web, said boss having a centrally disposed opening extending transversely therethrough, an elongated substantially cylindrical member having a pair of opposed end walls fixedly secured to the opposed ends, respectively, of said cylindrical member, said hollow cylindrical member being formed of transparent plastic material and said end walls thereof also being formed of a transparent plastic material, said hollow cylindrical member being telescoped within said bore, means fixedly securing said hollow cylindrical member to said I-shaped member, a second substantially hollow cylindrical member having a pair of opposed open ends and a main body portion, said main body portion having an internally disposed curvilinear recess formed therein and an arcuately shaped recess, an arcuately shaped weight formed of nonmagnetic materials disposed within said arcuately shaped recess, said second hollow cylindrical member having the opposed ends thereof juxtaposed with respect to said closed ends of said first hollow cylindrical member, said ends of said second hollow cylindrical member having indicia thereon and said end walls of said first hollow cylindrical member having a plurality of sight lines thereon, a liquid disposed within said first hollow cylindrical member, said liquid having a predetermined specific gravity so that said second hollow cylindrical member is suspended therein within said first hollow cylindrical member, and means for introducing said liquid into said first hollow cylindrical member.

4. A combined level and inclinometer as defined in claim 3 wherein one of said longitudinally extending flanges of said I-shaped member and a portion of said boss immediately adjacent thereto are formed with an arcuately shaped recess communicating with the outer side of said first hollow cylindrical member, said side of said first hollow cylindrical member adjacent said last named recess having an indicating line extending transversely thereacross, and said second hollow cylindrical member having indicia disposed around the circumference thereof.

5. A combined level and inclinometer as defined in claim 4 wherein said second hollow cylindrical member is split on a plane perpendicular to the axis of said second hollow cylindrical member at a point intermediate the ends thereof, each of said split portions of said second hollow cylindrical member having a main body portion, each of said split portions having confronting curvilinear recesses formed therein and confronting arcuately shaped recesses formed therein, liquid tight means for securing said split portions together to form a curvilinear hollow compartment and an arcuately shaped compartment, and said arcuate compartment receiving said arcuately shaped weight therein.

References Cited in the file of this patent

UNITED STATES PATENTS

| 1,339,787 | Powell | May 11, 1920 |
| 1,634,934 | Donaldson | July 5, 1927 |
| 2,179,467 | Cox | Nov. 7, 1939 |

FOREIGN PATENTS

| 117,161 | Great Britain | July 11, 1918 |